Jan. 26, 1937.  H. A. MANNSHARDT  2,068,863
SECTIONALLY SUPPORTED WALL
Filed Aug. 1, 1931  3 Sheets-Sheet 2
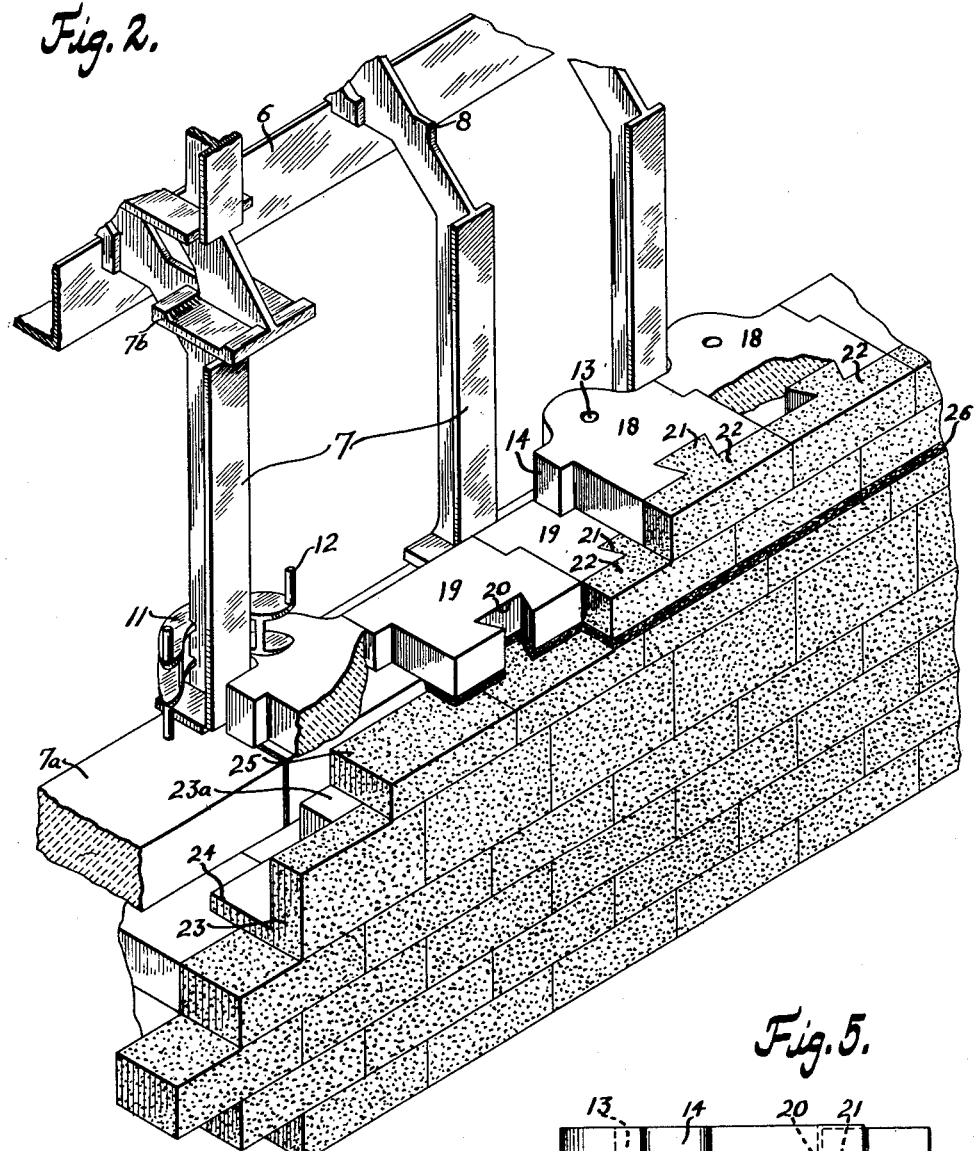
Fig. 2.
Fig. 5.
INVENTOR
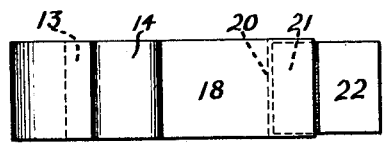
BY
ATTORNEYS Jan. 26, 1937.  H. A. MANNSHARDT  2,068,863
SECTIONALLY SUPPORTED WALL
Filed Aug. 1, 1931    3 Sheets-Sheet 3

INVENTOR
Hans A. Mannshardt
BY
Synnestvedt & Lechner
ATTORNEYS

Registered Jan. 26, 1937

2,068,863

UNITED STATES PATENT OFFICE 2,068,863

SECTIONALLY SUPPORTED WALL

Hans A. Mannshardt, Elmhurst, N. Y., assignor to American Arch Company, Inc., New York, N. Y., a corporation of Delaware Application August 1, 1931, Serial No. 554,493

10 Claims. (Cl. 110—1)

This invention relates to furnace walls and is particularly concerned with the refractory elements or construction thereof.

In general, this invention has in view improving combustion conditions. Specifically, the present invention contemplates the reduction of clinker adherence to furnace side walls especially in the vicinity of the fuel burning means therein. The invention has as an additional object increasing the life of the refractories as a whole and thus reduction in maintenance costs.

Still more specifically, according to the present invention, a wall, or the walls, of a combustion chamber are made up of refractory materials, preferably in the form of blocks or bricks, the said blocks or bricks having different heat resisting characteristics in different wall areas or sections. In the preferred arrangement I construct the furnace walls, in large part, of bricks composed of any of the usual fire clays and provide a strip or zone of the wall, in the vicinity of the fuel burning means or high temperature zone, of very highly refractory material, for example, carborundum, silicon carbide, high alumina, or compounds thereof.

By the use of relatively highly refractory material in the high temperature zone or zones of a combustion chamber, in accordance with the present invention, I am enabled to utilize the more usual type of refractory blocks in other areas or sections of the wall structures. In this way the total initial cost, as well as maintenance costs, are reduced to a minimum, it being borne in mind that the relatively highly refractory materials are considerably more expensive than the fire clay materials ordinarily employed in the manufacture of refractory blocks.

This invention, furthermore, in addition to reducing initial and maintenance costs, provides a novel, sturdy and convenient manner or means of application of the highly refractory material in the high temperature zone.

Still further, I aim to combine the advantages of a "sectionally supported" wall structure with various other advantages more fully pointed out hereinafter with respect to the construction or application of the highly refractory blocks in the form of a veneer at the inner face of a wall.

The problems arising in this connection, as well as the manner in which they have been overcome, will be more apparent when it is considered that in a furnace having a burning or fuel grate angularly or obliquely disposed therein, the high temperature zone in the combustion chamber is often extended, in the vicinity of the grate, diagonally across, or at least within, a plurality of the substantially independently supported wall sections. With this in mind, the present invention makes use of certain special block or brick forms which facilitate completion or extension of the highly refractory area from one wall section to another, and yet maintains substantial uniformity in the structural elements necessary in building furnace walls of the type now known as "sectional walls". In this respect my invention contemplates certain novel features of cooperation with wall structures of the nature disclosed in the copending applications of P. W. Antill, Serial No. 152,768, filed December 6th, 1926, (now Patent No. 1,927,909) and Serial No. 170,202, filed February 23rd, 1927 (now Patent No. 1,939,646).

In addition to all the foregoing this invention has in view the more general objects of rugged and yet readily replaceable wall elements as well as a high factor of safety and effective combustion chamber insulation.

How the foregoing together with other objects and advantages are obtained will be more apparent from a consideration of the following description making reference to the accompanying drawings in which the preferred structure embodying various features of this invention is illustrated.

Figure 2 is an isometric view of a portion of the wall structure, in this figure the wall structure being broken away at various points in order to illustrate wall supporting elements therebehind;

Figure 5 is another detail view illustrating the bricks which I prefer to employ.

Figure 1:
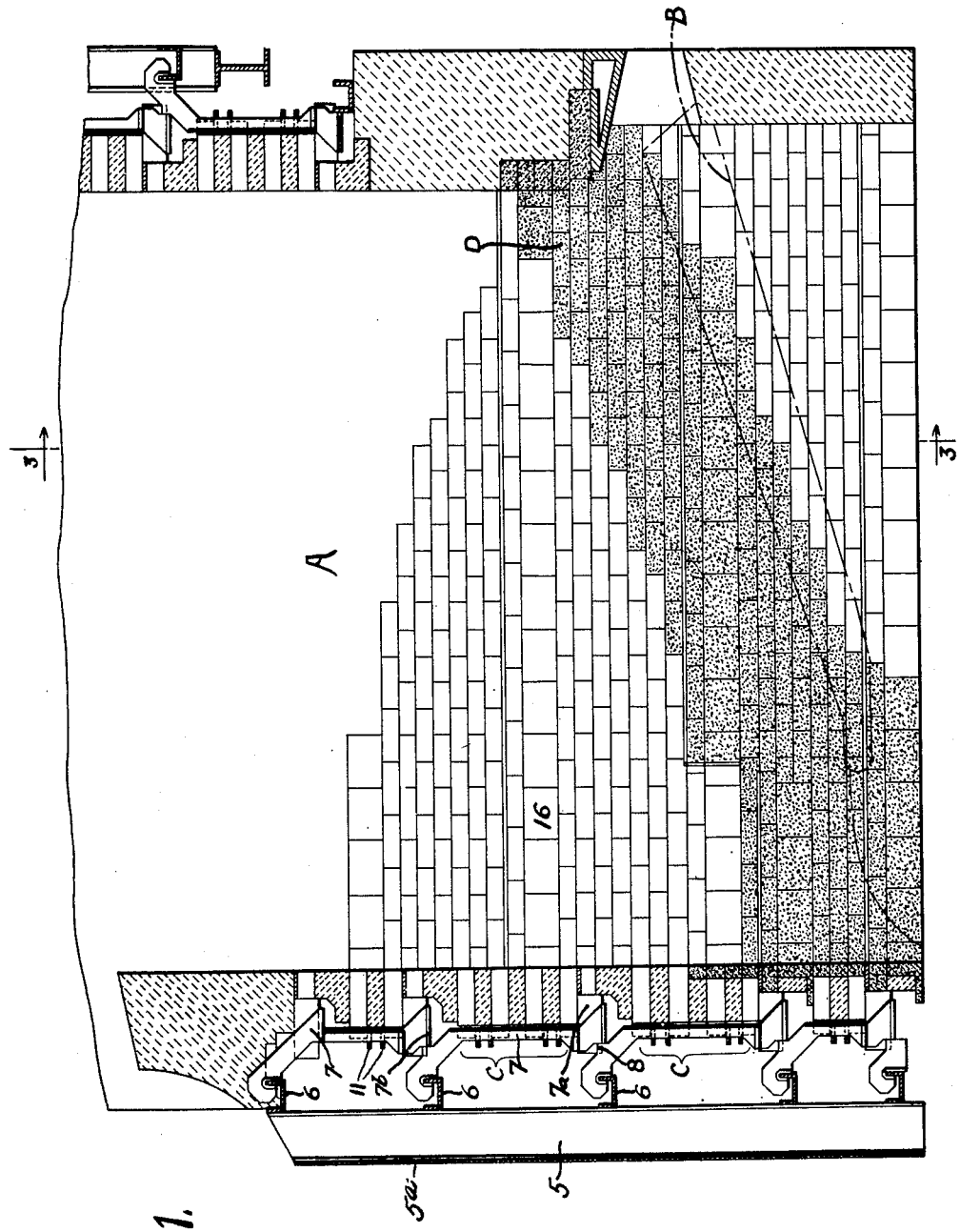
Figure 1 is a fragmentary vertical sectional view of a furnace or combustion chamber to which the wall structure of the present invention has been applied.

Making reference now to Figure 1, it will be seen that I have therein illustrated a furnace combustion chamber, designated generally by the reference letter A in which a fuel grate B is disposed in a position somewhat angled with respect to the horizontal. While various features of this invention are especially useful in a furnace of this character, it should be borne in mind that many features may also be of substantial advantage in other furnace structures. In this connection it might be noted that the structure of this invention may also be applied to chain grate stoker fired or other stoker fired installations in substitution for the usual water-backs, or may be applied to industrial and melting furnaces or to clinker grinder pits, or to furnaces adapted to the burning of oil, gas or pulverized coal, especially the latter, where the installation is designed to maintain operating temperatures sufficiently high to slag the refuse. However, and by way of example, it should be noted that in a furnace adapted to the burning of pulverized coal, oil or gas, the high temperature zone ordinarily is located somewhat differently from that in a furnace employing a grate structure such as illustrated in Figure 1, but, as will be still more apparent from consideration of the following description, various features of the present invention may readily be applied to a wide variety of different installations although, in different cases, it may be found to be desirable to somewhat alter portions of the particular brick work structure herein described.

Figure 3:
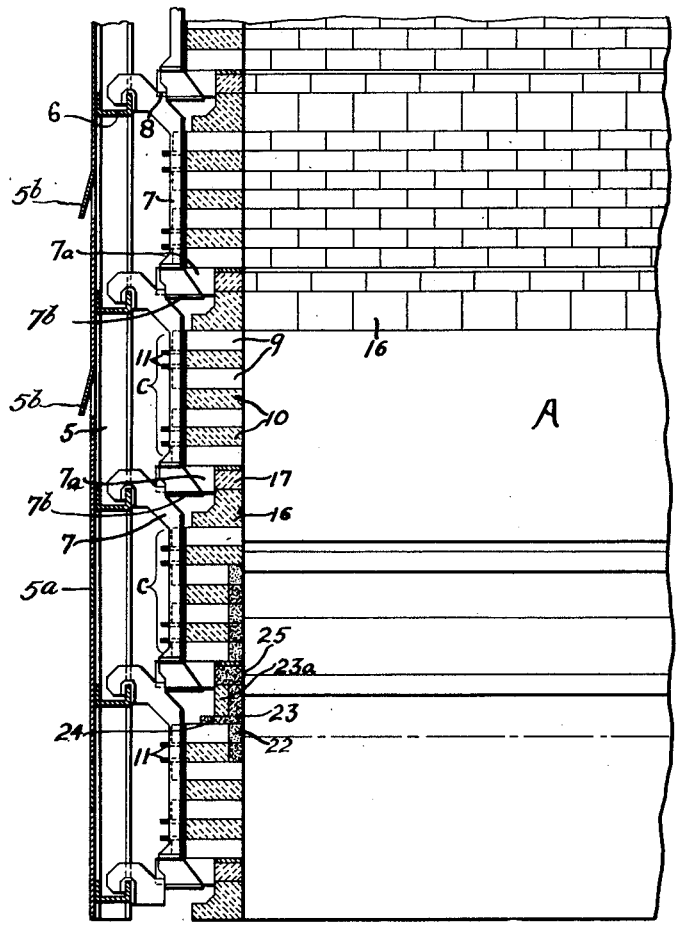
Figure 3 is a vertical sectional view taken substantially as indicated by the section line 3—3 of Figure 1.

As seen most clearly in Figures 1 and 3, the wall structures for the combustion chamber A are sectionally constructed and supported (see reference letter C) in a manner similar to that disclosed in said copending application, Serial No. 170,202, filed February 23rd, 1927, of P. W. Antill, assignor to the assignee of this application.

In Figure 1 I have illustrated a wall structure made up of sections of the type above referred to, certain sections of which, in the vicinity of the inclined fuel-burning means, which may be a chain grate or underfeed stoker structure B, include or carry a highly refractory veneer or facing indicated generally by the reference letter D. From inspection of Figure 1 it will be seen that this highly refractory area is elongated or extended substantially lengthwise of the grate structure B with the lower edge thereof extended slightly below the upper level of the grate. By constructing the remainder of the walls of the chamber of refractory blocks or bricks of the more usual type the total expense of the structure is reduced and, at the same time, erosion of and clinker adherence to the refractories is materially reduced. With the area of highly refractory material disposed adjacent the high temperature zone in the combustion chamber, in accordance with the above, the frequency of replacements is reduced to a minimum.

As illustrated in various of the figures, the upright walls of the furnace are supported by means of vertical beams 5 and vertically spaced but horizontally extended supporting members 6 which may take any desired form, the channel members 6 being shown only by way of example. The beams 5 may serve to support an outer sheathing 5a in which doors or dampers 5b may be arranged, the sheathing serving, together with the inner refractory wall structure, to define passages for the circulation of air.

In the preferred arrangement each one of the channel members 6 is arranged to support the row of hangers 7 which cooperates to support one section of the wall. These hangers, of course, are spaced from each other along their associated supporting element 6 and depend therefrom, preferably to abutments 8 associated with a subjacent row of hangers (see Figs. 1 and 3). In this way the hanger members are maintained in substantially vertical position and, at the same time, are permitted freedom to expand and contract vertically under the influence of temperature changes in the furnace.

In wall areas remote from the high temperature zone, each section of the wall structure itself is preferably made up of superimposed and staggered rows of bricks 9 and 10. At least some of these bricks are directly secured to the hanger members as by means of tie devices 11, one of which is clearly illustrated in Figure 2 as embracing a hanger 7 and also as being provided with projections 12 adapted to be received in suitable apertures 13 of the bricks. As indicated in Figures 1 and 3, however, only certain of the bricks in wall areas remote from the grate are directly secured to the hangers (see bricks 9) while interposed rows of bricks (10) are secured in position by complementary projections 14 and recessed portions 15 formed on bricks 9 as well as on bricks 10. This complementary shoulder and recess interengagement is clearly illustrated as applied to the bricks shown in plan in Figure 4 although it should be noted that in this figure, the bricks shown are some of those which are positioned within the high temperature zone adjacent to the grate. In this connection, however, it is pointed out that the general arrangement of various brick elements within as well as remote from the high temperature zone, is quite similar or uniform, this being advantageous in reducing the number of different brick supporting elements which would otherwise be necessary.

As seen most clearly in Figure 3, the bricks 9 and 10 are supported on elongated bricks 7a, each of which extends between a pair of hangers to receive support from the shelf means 7b thereof.

The various bricks 9 and 10, as well as others such as those indicated at 16 and 17, (see Fig. 3) of which the wall sections are made up in areas remote from the high temperature zone, serve to complete the entire wall thickness.

Turning now to the wall construction within the high temperature zone, as illustrated for example in Figure 2, it will be seen that bricks 18 and 19 adapted, respectively, to be directly and indirectly supported as against lateral displacement from the hanger members, are also here employed. These bricks are similar to those described above with respect to the manner of attachment to the hangers and also with respect to the provision of complementary shoulder and recess connections therebetween.

Figure 4:
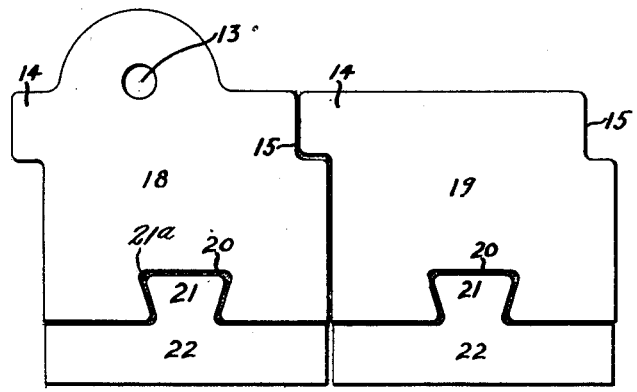
Figure 4 is a substantially enlarged and detail showing of several of the brick elements which I prefer to employ.

The bricks 18 and 19, however, differ from those indicated at 9 and 10, firstly by being of somewhat smaller dimensions transversely of the wall. In the second place, each one of the bricks 18 and 19 is provided with a dovetail groove 20 at its inner end (see Fig. 4) which is adapted to receive the similarly shaped projection 21 of a facing and highly refractory block 22. As best seen in Figure 4 the dovetailed recess 20 of each brick 18—19 preferably has somewhat larger internal dimensions than the overall dimensions of the heads or projections 21 of the surfacing blocks, this arrangement providing a small space in which sand or clay 21a may be disposed. In this way, certain freedom for relative expansion and movement of the outer and inner blocks is provided for and, at the same time, renewals or replacements are facilitated. Additionally, and to allow for greater expansion and growth, the facing bricks are preferably of slightly smaller dimensions than the outer wall bricks, when viewed from the top, as in Figure 4, as well as when viewed from the side, as in Figure 5.

At the junction of two adjacent wall sections, I preferably employ substantially L-shaped bricks 23 having one leg or side of each supported on the top row of bricks 18 and 19 of the lower section. As clearly seen in Figures 2 and 3 each L-shaped block has one side thereof extended substantially rearwardly as indicated at 24 to provide somewhat extended support on the immediately subjacent bricks 22 and 18 or 19. Where the spacing between the wall sections is substantially as illustrated in Figures 1, 2 and 3, I also employ regular brick-shaped blocks 25 supported on the L-members 23 in order to complete the wall surface between the sections thereof. Still further, I preferably dispose fire clay or sand 26 between the blocks which are supported in adjacent sections in order to provide an expansion joint to permit relative movement thereof in various directions. A filling brick 23a may also be positioned to complete the desired thickness and support beneath the blocks 25.

It will be observed in considering the foregoing structure that the reduction in the thickness or width of the outer bricks in the high temperature zone, results in a smooth inner wall surface after application of the highly refractory surfacing blocks. At the same time the total quantity of highly refractory material necessary in building up this structure is reduced to a minimum without, however, sacrificing insulation or furnace protection. The highly refractory blocks in the high temperature zone protect the walls in this region from erosion and, in addition reduce the difficulties incident to the adherence of clinkers to the wall surfaces. It is important to note that, in accordance with the present invention, these various advantages are attained in a structure which is very materially less expensive in manufacture than structures in which the entire furnace walls are made up of bricks of the carborundum, silicon carbide, or other high refractory type. At the same time, this more durable and heat resisting wall structure is built up in such manner as to facilitate renewals and replacements at times when this becomes necessary.

Finally, it is important to bear in mind that the present invention provides for the attainment of the foregoing advantages in a wall structure which is sectionally supported, adequate provision being made for the extension of the highly refractory blocks between or across a plurality of wall sections. This extension of the highly refractory area between or across a section, in addition, does not complicate or interfere with the mounting of the more usual type of bricks such as those indicated at 9 and 10, in a portion of the same section. The highly refractory blocks, therefore, may be disposed in substantially any wall area desired even though the walls are made up of substantially independently supported sections.

What I claim is:—

1. In a sectionally supported furnace wall, supporting members for the sections, outer bricks supported by the members and inner surface bricks supported by the outer bricks, certain of the inner bricks being substantially L-shaped to provide extended surface contact with an outer brick.

2. In a sectionally supported furnace wall, supporting members for the sections, outer bricks supported by the members and inner surface bricks supported by the outer bricks, there being a plurality of superimposed inner bricks an intermediate one of which is substantially L-shaped and positioned to provide extended surface contact with an outer brick.

3. In a sectionally supported furnace wall, supporting members for the sections, outer bricks supported by the members and inner surface bricks supported by the outer bricks, there being a plurality of superimposed inner bricks an intermediate one of which is substantially L-shaped and positioned to provide extended surface contact with an outer brick, together with a dovetail connection between an outer brick and an inner brick adjacent said L-shaped brick.

4. In a sectionally supported furnace side wall, a wall section including supporting members, a plurality of rows of outer bricks supported by the members, a plurality of rows of inner wall surfacing bricks supported by the outer bricks, and a row of bricks adjacent the top of the section supported in part by subjacent inner bricks and in part by subjacent outer bricks.

5. In a sectionally supported furnace side wall, a wall section including supporting members, a plurality of rows of outer bricks supported by the members, a plurality of rows of inner wall surfacing bricks supported by the outer bricks, and a row of bricks adjacent the top of the section supported in part by subjacent inner bricks and in part by subjacent outer bricks, together with an additional row of inner bricks supported by the row last mentioned.

6. In a sectionally supported furnace side wall, a wall section including supporting members, a plurality of rows of outer bricks supported by the members, a plurality of rows of inner wall surfacing bricks supported by the outer bricks, and a row of bricks adjacent the top of the section supported in part by subjacent inner bricks and in part by subjacent outer bricks, bricks of the last mentioned row being substantially L-shaped and being positioned with one leg overlying the subjacent bricks and with the other leg at the inner wall surface.

7. In a furnace wall construction having an outer wall or supporting shell and an inner wall or furnace lining supported away from said outer wall with an interwall air space, the combination of a multiplicity of horizontal courses of fire brick grouped to form a plurality of horizontally extending belts or sections, said belts or sections being superposed to form said inner wall, means carried by the outer wall for vertically supporting adjacent sections of the inner wall substantially independently of each other in relative positions which leave space for independent expansion of the sections, means for laterally securing the bricks of said sections to said last mentioned means, and a furnace facing strip for a portion of the inner wall comprising a plurality of blocks of more highly refractory material than said fire brick, certain of said blocks being interlockingly engaged with the fire bricks in an upper part of one wall section for lateral positioning against falling into the furnace, and others of said blocks being positioned to be vertically supported upon said first mentioned blocks and extending upwardly in overlapped relation to fire bricks in a lower portion of the adjoining superjacent section, whereby a part of the facing which is vertically and laterally positioned by one wall section provides a slip-joint with the fire brick of a superjacent section.

8. In a furnace wall construction having an outer wall or supporting shell and an inner wall or furnace lining supported away from said outer wall with an interwall air space, the combination of a multiplicity of horizontal courses of fire brick grouped to form a plurality of horizontally extending belts or sections, said belts or sections being superposed to form said inner wall, means carried by the outer wall for vertically supporting adjacent sections of the inner wall substantially independently of each other in relative positions which leave space for independent expansion of the sections, means for laterally securing the bricks of said sections to said last mentioned means, and a furnace facing strip for a portion of the inner wall comprising a plurality of blocks of more highly refractory material than said fire brick, certain of said blocks being inset into and interlockingly engaged with the respective fire bricks of adjoining wall sections for individual lateral positioning of said blocks by said bricks as against falling into the furnace and for independent replacement in each of said wall sections, and others of said blocks being positioned to be vertically supported upon the interlocked blocks of one wall section and extending upwardly in overlapped relation to fire bricks in a lower portion of the adjoining superjacent section, whereby a part of the facing which is vertically and laterally positioned by one wall section provides a slip-joint with the fire brick of a superjacent section.

9. For a furnace having an inclined grate or the like and an adjacent side wall construction having an outer wall or supporting shell and an inner wall or furnace lining supported away from said outer wall with an interwall air space, the combination of a multiplicity of vertically superposed horizontal courses of fire brick grouped to form a plurality of horizontally extending belts or sections, said belts or sections being superposed to form said inner wall, means carried by the outer wall for vertically supporting adjacent sections of the inner wall substantially independently of each other in relative positions which leave space for independent expansion of the sections, means for laterally securing the bricks of said sections to said last mentioned means, and a furnace facing strip for a portion of the inner wall, inclined along the grate zone and comprising a plurality of blocks of more highly refractory material than said fire brick, certain of said blocks being interlockingly engaged with the fire bricks in an upper part of one wall section for lateral positioning against falling into the furnace, and others of said blocks being positioned to be vertically supported upon said first mentioned blocks and extending upwardly in overlapped relation to fire bricks in a lower portion of the adjoining superjacent section, said highly refractory blocks being arranged in superposed horizontal courses which are in stepped relation longitudinally of the wall to form said inclined strip.

10. A refractory wall construction comprising a plurality of superposed horizontal rows of vertically extending elongated hanger members, means on said members for giving vertical support to refractories, a plurality of corresponding horizontally extending refractory wall sections or belts each composed of a plurality of refractory blocks vertically supported on the support means of the respective adjacent hanger members, tie means at the outer side of the said blocks detachably securing said blocks to the hanger members as against lateral displacement, inner surface bricks forming a highly refractory lining for at least a portion of one of said wall sections, at least some of said bricks having means of interengagement with said blocks for vertical and lateral support therefrom independent of other sections, the upper bricks of said lining being positioned at the inner lateral side of the lower refractories of a superjacent section of the wall for vertically sliding interengagement therewith.

HANS A. MANNSHARDT.